Patented May 28, 1940

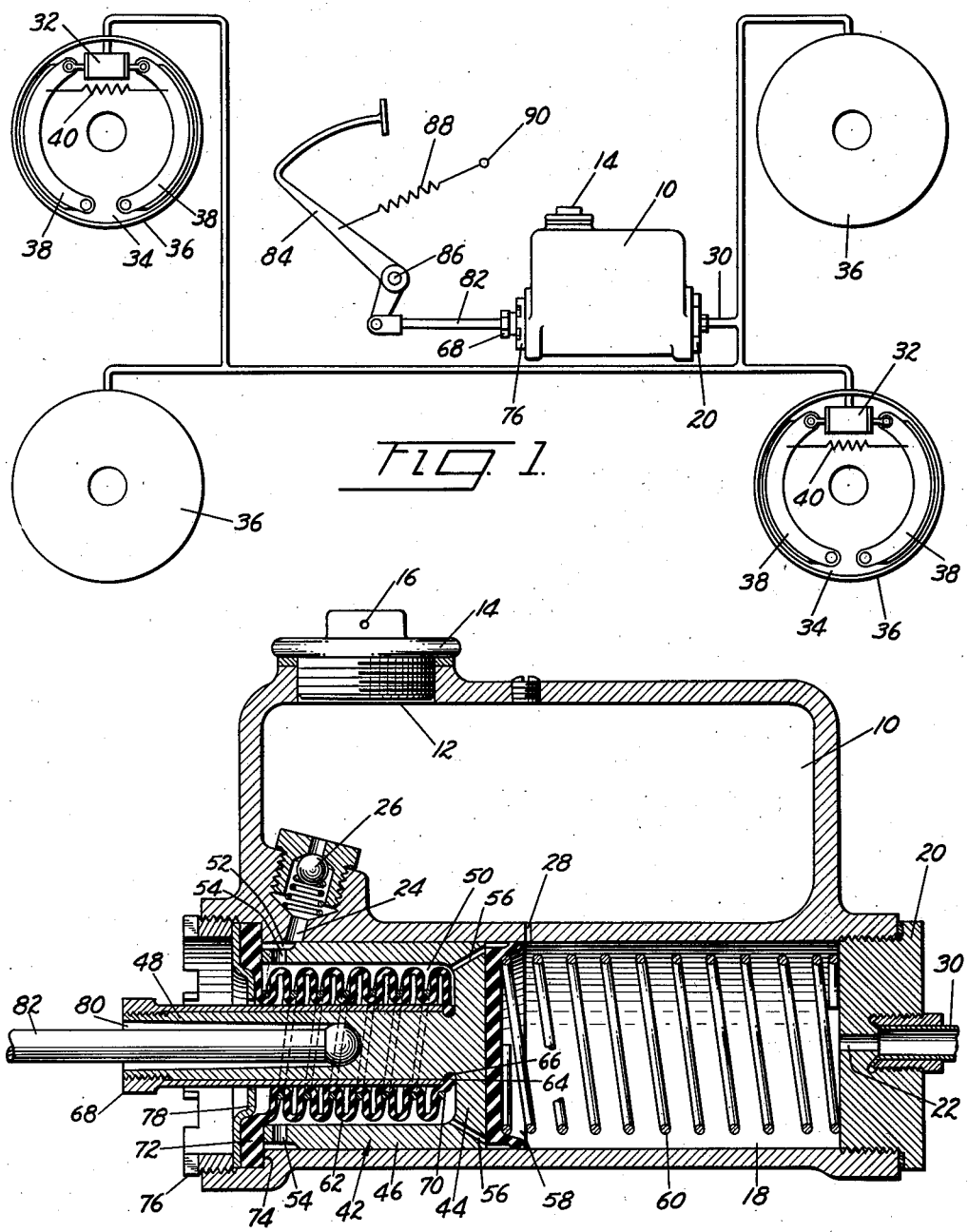

2,202,351

UNITED STATES PATENT OFFICE 2,202,351

FLUID PRESSURE PRODUCING DEVICE

Erwin F. Loweke, Detroit, Mich., assignor to Hydraulic Brake Company, Detroit, Mich., a corporation of California Application June 3, 1937, Serial No. 146,191

3 Claims. (Cl. 60—54.6)

This invention relates to fluid pressure braking systems, and more particularly to fluid pressure producing devices therefor.

The invention comprehends a fluid pressure producing device of simplified structure operative to introduce a surplus of fluid into a fluid pressure braking system upon completion of a braking operation so that air or gas bubbles in the fluid may be expelled therefrom to the end that a more satisfactory operation of the system may be had.

An object of the invention is to provide a fluid pressure producing device operative to overfill a fluid pressure braking system with fluid upon the completion of each braking operation.

Another object of the invention is to provide a fluid pressure producing device including a cylinder and a piston movable in the cylinder having therein an expansible fluid chamber.

Another object of the invention is to provide a fluid pressure producing device including a fluid reservoir, a cylinder supplied therefrom, and a piston movable in the cylinder having therein an expansible fluid chamber supplied from the reservoir during the compression stroke of the piston and adapted to discharge fluid therefrom into that portion of the cylinder forward of the piston during the retraction stroke of the piston.

A feature of the invention is a cylinder and a piston movable in the cylinder having therein a variable annular chamber, and means for sealing the chamber so as to avoid seepage of fluid from the chamber.

Other objects and advantages of the invention will appear from the following description taken in connection with the drawing forming a part of this specification, and in which—

Fig. 1 is a diagrammatical illustration of a fluid pressure braking system embodying the invention; and Fig. 2 is a vertical sectional view of the fluid pressure producing device coupled in the system.

Referring to the drawing for more specific details of the invention, 10 represents a fluid reservoir having a filling opening 12 which may be closed as by a plug 14 provided with suitable openings 16 for venting the reservoir to the atmosphere.

A cylinder 18 at the base of the reservoir is open at one of its ends, and is closed at its other end as by a head 20 provided with a discharge port 22. The cylinder has a port 24 providing a communication between the cylinder and the reservoir, and a one-way valve 26 controls the communication so that fluid may flow only from the reservoir into the cylinder. The cylinder also has a port 28 providing another communication between the cylinder and the reservoir.

A fluid pressure delivery pipe 30 suitably connected to the discharge port 22 has branches connected respectively to fluid pressure actuated motors 32. Preferably the motors are arranged in pairs, one pair for actuating the brakes associated with the front wheels of a vehicle and another pair for actuating the brakes associated with the rear wheels of a vehicle.

The brakes are of a preferred type each including a fixed support or backing plate 34, a rotatable drum 36 associated therewith, a pair of corresponding interchangeable friction elements or shoes 38 mounted on the backing plate for cooperation with the drum, and a motor corresponding to the motors 32 mounted on the backing plate between the shoes and operative to actuate the shoes into engagement with the drum against the resistance of a retractile spring 40 connecting the shoes.

A piston 42 reciprocable in the cylinder 18 includes a head 44, a skirt 46, and a concentric extension 48 on the back of the head projecting through and beyond the skirt and providing in conjunction with the skirt an annular chamber 50. The skirt of the piston has a circumferential groove 52 normally communicating with the port 24 and a plurality of spaced ports 54 through its wall providing communications between the groove 52 and the annular chamber 50.

The head of the piston has a plurality of spaced ports 56 providing communications between the annular chamber and that portion of the cylinder 18 forward of the head of the piston. A sealing cup 58 seated on the head of the piston controls the ports 56, and a spring 60 interposed between the cup and the head 20 of the cylinder serves to retain the cup against displacement and also to return the piston to its retracted position.

A spiral collapsible tube 62, preferably made of rubber, is sleeved on the extension 48 within the annular chamber 50. This tube has upon one end a ring 64 seated in a circumferential groove 66 in the extension 48 at the junction of the extension 48 and the head 44 of the piston 42. A sleeve 68 fitted on the extension and suitably secured against displacement serves to retain the ring 64 in place. The tube 62 has thereon a spiral spring 70, the convolutions of which alternate with the convolutions of the tube. This spring serves to retain the tube 62 in close engagement with the extension 48 and also insures the proper folding thereof when collapsed. The other end of the tube 62 has formed thereon a heavy ring or washer 72 seated on an annular shoulder 74 in the open end of the cylinder, and a retaining ring 76 threaded in the open end of the cylinder with a washer 78 interposed secures the washer 72 against displacement.

The extension 48 has therein a recess 80 receiving one end of a thrust rod 82, the other end of which is pivoted to a foot pedal lever 84 mounted on a stub shaft 86 and connected by a retractile spring 88 to a fixed support 90.

In a normal operation, upon depressing the foot pedal lever 84, force is transmitted from this lever through the rod 82 to the piston 42, resulting in movement of the piston on its compression stroke. During the initial movement of the piston on its compression stroke, the cup 58 on the head of the piston covers the port 28, and thereafter as the piston advances on its compression stroke the fluid in the cylinder forward of the piston is displaced therefrom through the discharge port 22 and the fluid pressure delivery pipe or conduit 30 and its branches to the fluid pressure actuated motors 32, resulting in actuation of the motors. This actuation of the motors results in movement of the shoes 38 of the respective brakes into engagement with the drums 36 against the resistance of the retractile springs 40.

As the piston moves on its compression stroke the collapsible spiral tube 62 extends and the area of the annular chamber 50 is materially increased. This results in creating a partial vacuum in the chamber 50, resulting in drawing fluid from the reservoir through the port 24, past the valve 26 into the cylinder 18, from whence it passes through the circumferential groove 52 and ports 54 into the annular chamber 50, completely filling the chamber.

Upon completion of a braking operation, the foot pedal lever 84 is released, and the pedal is returned to its retracted or normal position under the influence of the retractile spring 88. As the foot pedal lever returns to its retracted position, the rod 82 is also retracted and this results in release of the piston 42 and the return of the piston to its retracted position under the influence of the spring 60.

As the piston returns to its retracted position the fluid in the annular chamber 50 is displaced therefrom through the ports 56 in the head of the piston, past the cup 58, into that portion of the cylinder 18 forward of the piston, completely filling the cylinder 18; and simultaneously therewith the fluid in the motors 32 and the fluid pressure delivery pipe 30 and its respective branches connecting these motors to the cylinder 18 is returning to the cylinder 18 under the influence of the retractile springs 40 connecting the shoes 38 of the respective brake structures. Under these conditions, the fluid received by the cylinder 18 may be in excess of the quantity of fluid required to completely fill the cylinder 18, and in that event the surplus fluid received by the cylinder 18 is displaced therefrom through the port 28 into the cylinder.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is—

1. A fluid pressure producing device comprising a reservoir, a single-diameter cylinder associated therewith and supplied therefrom, a piston reciprocable in said cylinder, said piston having a forward face and an annular recess in rear of said face, a flexible wall in said recess and forming a sealed connection between said cylinder and a part of said piston adjacent the forward end of said recess, said flexible wall expanding and contracting with movement of said piston and cooperating with said piston and cylinder to provide a chamber of variable volume in rear of the forward face of said piston, a passage connecting said chamber with said reservoir, a valve in said passage preventing flow of fluid from said chamber to said reservoir, a passage connecting said chamber with that part of the cylinder forwardly of the piston, valve means preventing flow of fluid from said cylinder through said last named passage, and means for reciprocating said piston.

2. A fluid pressure producing device comprising a reservoir, a single-diameter cylinder associated therewith and supplied therefrom, said piston having a forward face and an annular recess in rear of said face, said recess opening toward the rear of said piston, a flexible wall in said recess and forming a sealed connection between said cylinder and a part of said piston adjacent the forward end of said recess, said flexible wall expanding and contracting with movement of said piston and cooperating with said piston and cylinder to provide a chamber of variable volume in rear of the forward face of said piston, a passage connecting said chamber with said reservoir, a valve in said passage preventing flow of fluid from said chamber to said reservoir, a passage connecting said chamber with that part of the cylinder forwardly of the piston, valve means preventing flow of fluid from said cylinder to said last named passage, a port forwardly of the rest position of the piston for connecting the cylinder and reservoir, and means for reciprocating said piston.

3. A fluid pressure producing device comprising a reservoir, a single-diameter cylinder associated therewith and supplied therefrom, a piston reciprocable in said cylinder, said piston having a forward face and an annular recess in rear of said face, a spiral collapsible metal tube in said recess and forming a sealed connection between said cylinder and a part of said piston adjacent the forward end of said recess, said tube expanding and contracting with movement of said piston and cooperating with said piston and cylinder to provide a chamber of variable volume in rear of the forward face of said piston, a spring threaded on said tube, a passage connecting said chamber with said reservoir, a valve in said passage preventing flow of fluid from said chamber to said reservoir, a passage connecting said chamber with that part of the cylinder forwardly of the piston, valve means preventing flow of fluid from said cylinder through said last-named passage, and means for reciprocating said piston.

ERWIN F. LOWEKE.